United States Patent
Kim et al.

(10) Patent No.: US 10,232,756 B2
(45) Date of Patent: Mar. 19, 2019

(54) LEG REST APPARATUS

(71) Applicants: Hyundai Motor Company, Seoul (KR); Kia Motors Corporation, Seoul (KR)

(72) Inventors: Bong-Ku Kim, Gyeonggi-do (KR); Young-Bok Sung, Gyeonggi-do (KR); Sang-Ho Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 283 days.

(21) Appl. No.: 15/253,262

(22) Filed: Aug. 31, 2016

(65) Prior Publication Data

US 2017/0318971 A1    Nov. 9, 2017

(30) Foreign Application Priority Data

May 9, 2016    (KR) .................. 10-2016-0056566

(51) Int. Cl.
   *B60N 2/90*    (2018.01)
(52) U.S. Cl.
   CPC .................... B60N 2/995 (2018.02)
(58) Field of Classification Search
   CPC ........ A47C 1/0355; A47C 7/506; B60N 2/995
   USPC ........................... 297/423.26, 85 R
   See application file for complete search history.

(56) References Cited

U.S. PATENT DOCUMENTS 6,769,734 B2 *   8/2004   Tacker .................. A47C 1/037
                                                     297/61
7,429,083 B2 *   9/2008   Tsuji ...................... B60N 2/995
                                                     297/423.26
7,959,221 B2 *   6/2011   Anglese ................. A47C 7/506
                                                     297/69
8,070,219 B2 *   12/2011  Walters .................. A47C 7/506
                                                     297/182
9,198,516 B2 *   12/2015  Yamada ................. B60N 2/995

FOREIGN PATENT DOCUMENTS

| JP | 07-184736 A | 7/1995 |
| JP | 2006-006718 A | 1/2006 |
| JP | 2007-075512 A | 3/2007 |
| JP | 2009-066180 A | 4/2009 |
| JP | 2010-148775 A | 7/2010 |
| KR | 20-1996-0021415 U | 7/1996 |
| KR | 10-1998-0008738 A | 4/1998 |
| KR | 10-2013-0073221 A | 7/2013 |
| KR | 10-1405995 B1 | 6/2014 |

* cited by examiner

Primary Examiner — Milton Nelson, Jr.
(74) Attorney, Agent, or Firm — Mintz Levin Cohn Ferris Glovsky and Popeo, P.C.; Peter F. Corless

(57) ABSTRACT

A leg rest apparatus is provided. A leg rest panel is configured to be adjusted between a deployed position and a stored position. The apparatus includes a lift link that articulates a rear end and a front end rotatably coupled to the seat and the leg rest panel, respectively. A link base with a rear end fixed to the seat is separated from the lift link and a front end is disposed toward a front side of the seat. A front guide link with a front end and a rear end is rotatably connected to a first coupling portion of the leg rest panel and the link base, respectively. A rear guide link with a length less than the front guide link and a front end and a rear end rotatably connected to a second coupling portion separated from the first coupling portion and the link base, respectively.

14 Claims, 5 Drawing Sheets

FIG. 5A
RELATED ART
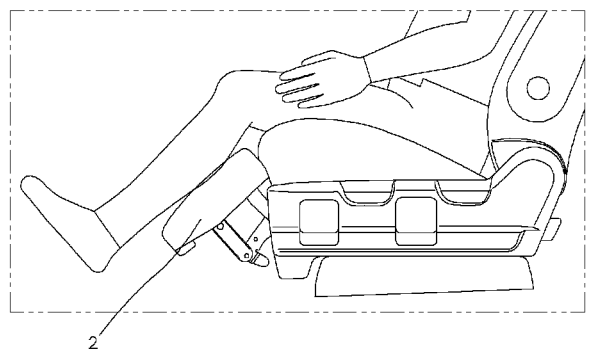
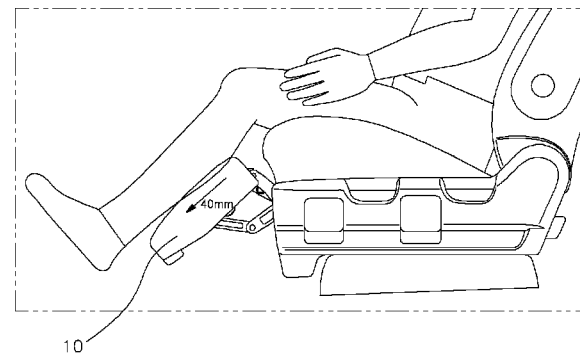
FIG. 5B

LEG REST APPARATUS

CROSS-REFERENCE TO RELATED APPLICATIONS

This application claims priority under 35 U.S.C. § 119 to Korean Patent Application No. 10-2016-0056566, filed on May 9, 2016, in the Korean Intellectual Property Office, the disclosure of which is incorporated herein by reference in its entirety.

BACKGROUND

1. Field of the Invention

The present invention relates to a leg rest apparatus (e.g., structure of a leg rest) mounted at a front lower side of a seat of a vehicle and more particularly, to a leg rest that reduces the weight of the apparatus by reducing the number of components performing link motion.

2. Description of the Related Art

A leg rest apparatus for a vehicle is mounted at a lower side of a vehicle seat (e.g., a rear seat at a rear side), and supports seated passengers calves when the seated passengers calves are placed on the leg rest, to improve the passenger's comfort. The leg rest for a vehicle has a leg rest panel 2 coupled to a link device to adjust the leg rest panel 2 between a deployed position (e.g., a state illustrated in the lower drawing in FIG. 1) when the leg rest panel 2 supports the seated passenger's calves and a stored position (e.g., a state illustrated in the upper drawing in FIG. 1) when the leg rest panel 2 is folded toward a seat 1.

The link device connects a plurality of link members and the leg rest panel is adjusted between the stored position and the deployed position based on the link motion of the link members. Automatic link devices have been developed which are operated by driving power of a motor and a manual link device which allows a user to adjust the leg rest panel manually. The automatic link device has advantages of improving the marketability of a vehicle and a link structure may be simplified. However, due to a high cost the automatic link device is applied only to limited high-grade vehicles. The manual link device has a relatively low price, but as illustrated in FIG. 1, since the leg rest panel is adjusted based on rotational motion of the respective link members (e.g., typically, six-axis articulated link motion), the number of components is increased.

The above information disclosed in this section is merely for enhancement of understanding of the background of the invention and therefore it may contain information that does not form the prior art that is already known in this country to those of ordinary skilled in the art.

SUMMARY

The present invention provides a leg rest apparatus, which may be used manually as well as automatically (e.g., by additionally mounting a motor or the like), enables link motion to be simplified (e.g., to four-axis articulated link motion) to reduce the number of components and improves support quality by allowing a leg rest panel to be moved further downward, when the leg rest panel is deployed.

An exemplary embodiment of the present invention provides a leg rest apparatus configured to be adjusted between a deployed position (e.g., the lowermost drawing in FIG. 3) when the leg rest panel at a front lower end of a seat to support a seated passenger's calves and a stored position (e.g., the uppermost drawing in FIG. 3) when the leg rest panel is folded to be proximate to the seat (e.g., moved rearward). The leg rest apparatus may include a lift link having a rear end rotatably coupled to the seat and a front end rotatably coupled to the leg rest panel, configured to articulation between the front end and the rear end. A link base may be spaced apart from the lift link and has a rear end coupled to the seat and a front end disposed to be directed toward a front side of the seat; a front guide link having a front end rotatably connected to a first coupling portion of the leg rest panel and a rear end rotatably connected to the link base and a rear guide link with a length less than the front guide link, and having a front end rotatably connected to a second coupling portion of the leg rest panel which is spaced apart from the first coupling portion and a rear end rotatably connected to the link base, when the leg rest panel is adjusted from the stored position to the deployed position, the leg rest panel may be adjusted while rotating by a difference in trajectory between the front guide link and the rear guide link.

The lift link may include a rear lift link with a rear end rotatably coupled to the seat and a front lift link with a rear end rotatably coupled to the front end of the rear lift link and a front end rotatably coupled to the leg rest panel disposed at a front side of the first coupling portion and the second coupling portion. The rear lift link may be rotatably coupled to a seat recliner disposed in the seat and may be configured to adjust an angle of a backrest of the seat. The front guide link may be formed in an arc shape.

When the leg rest panel is in the deployed position, the first coupling portion may be positioned at a higher position than the second coupling portion. The front guide link and the rear guide link may form an 'X' shape (see FIG. 3). The second end of a spring may be coupled to the seat and may be coupled to the rear lift link. Further, a centerline $\alpha$ in a longitudinal direction of the spring and a centerline $\beta$ in a longitudinal direction of the rear lift link may be disposed to form an included angle $\theta$ of 0° or greater. For example, the spring may be configured to provide an elastic force in a direction to maintain the position of the leg rest panel when the leg rest panel is at the stored position. The spring may be configured to provide an elastic force to adjust the leg rest panel and supports a load applied to the passenger's calves after the spring is maximally extended (e.g., beyond the dead point) when the leg rest panel is adjusted. One link base, one front guide link, one rear guide link, and one spring may be defined as one group. Further, two groups may be disposed at both sides of the leg rest panel, one for each side, with the lift link disposed between the two groups.

According to another exemplary embodiment the leg rest panel may be configured to rotate by a difference in trajectory between the front guide link and the rear guide link at the same time when the leg rest panel is adjusted forward by the lift link, the link motion may be simplified compared to the link motion in the related art structure. Accordingly, the number of components and a weight of the apparatus may be reduced.

In an exemplary embodiment, since the centerline $\alpha$ in the longitudinal direction of the spring and the centerline $\beta$ in the longitudinal direction of the rear lift link may be disposed to form the included angle $\theta$ of 0° or greater to extend the spring beyond the dead point (e.g., extends maximally) when the leg rest panel is adjusted from the stored position to the deployed position, the spring may be configured to provide an elastic force to maintain the position of the leg rest panel when the leg rest panel is adjusted to the stored position or the deployed position. Therefore, when the single spring is configured to provide elastic force at different positions (e.g., stored position or deployed position), the reduce the number of springs may be reduced (e.g., compared to a structure in the related art).

Operating force of the leg rest may be adjusted to meet the specifications by adjusting the positions of the first coupling portion and the second coupling portion and/or changing the lengths of the front guide link and the rear guide link (e.g., increasing or decreasing a difference in trajectory). Additionally, since the deformation amount of the spring for each movement distance of the leg rest panel may be reduced (e.g., since the link motion is simplified compared to the link motion in the related art), the operating force may be decreased. In particular, a portion where seated passenger's legs come into direct contact with the leg rest panel may be further downward compared to the structure in the related art (see FIG. 5), to improve support quality.

BRIEF DESCRIPTION OF THE DRAWINGS

The above and other objects, features and other advantages of the present invention will be more clearly understood from the following detailed description taken in conjunction with the accompanying drawings, in which:

FIG. 5A is an exemplary view illustrating a portion where the seated passenger's calves are in direct contact with a leg rest panel adjusted downward by 40 mm in the structure according to an exemplary embodiment of the present invention; and FIG. 5B is an exemplar view illustrating a portion where the seated passenger's calves are in direct contact with a leg rest panel according to a structure in the related art.

DETAILED DESCRIPTION

Figure 1:
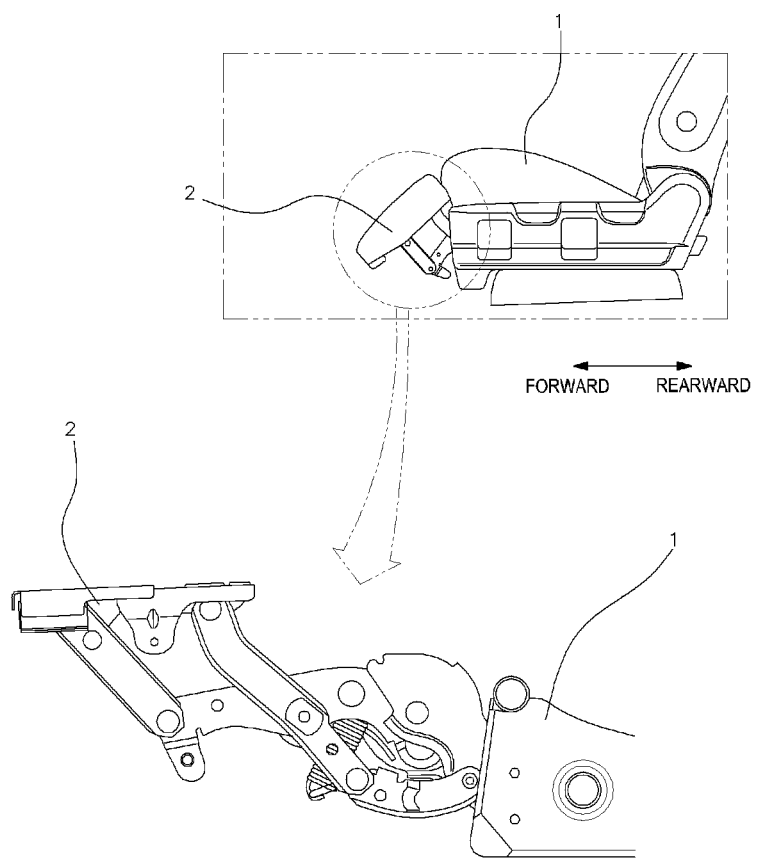
FIG. 1 is an exemplary view illustrating a leg rest in the related art mounted on a seat.

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein. On the contrary, the invention is intended to cover not only the exemplary embodiments, but also various alternatives, modifications, equivalents and other embodiments, which may be included within the spirit and scope of the invention as defined by the appended claims. Wherever possible, the same reference numbers will be used throughout the drawings to refer to the same or like parts. A part irrelevant to the description will be omitted to clearly describe the present invention, and the same or similar constituent elements will be designated by the same reference numerals throughout the specification.

In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a leg rest apparatus that may included leg rest panel 10 configured to be adjusted between a deployed position when the leg rest panel 10 is drawn at a front lower end of a seat to support a seated passenger's calves and a stored position when the leg rest panel 10 is folded toward the seat. Further operation stability and component durability is improved due to the simplified structure and may further improve support quality of a leg rest panel when the leg rest panel is positioned in a downward direction (see FIG. 5). Hereinafter, the structure of the leg rest according to the exemplary embodiment will be described in more detail with reference to the drawings.

Figure 2:
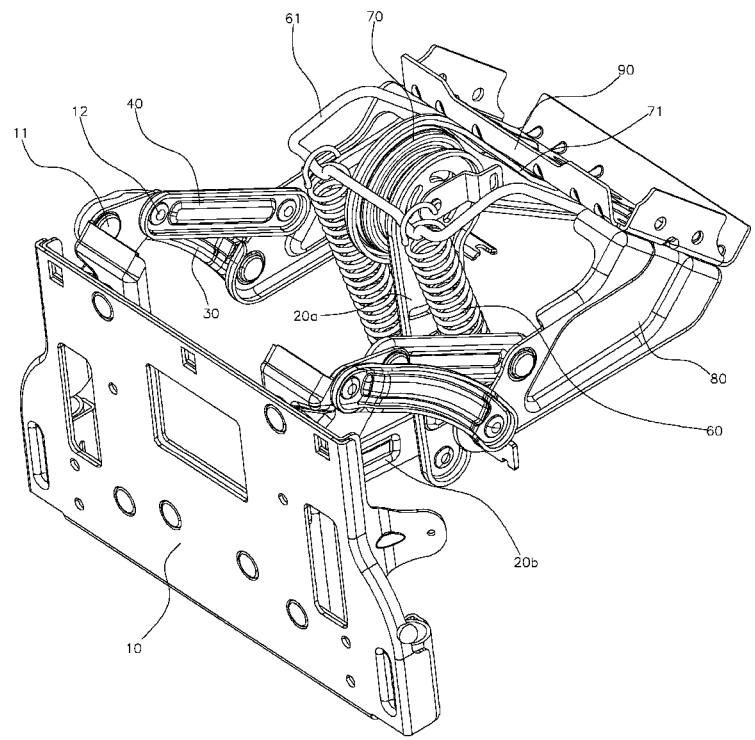
FIG. 2 is an exemplary of a perspective view illustrating an appearance of a leg rest according to an exemplary embodiment of the present invention.
Figure 3:
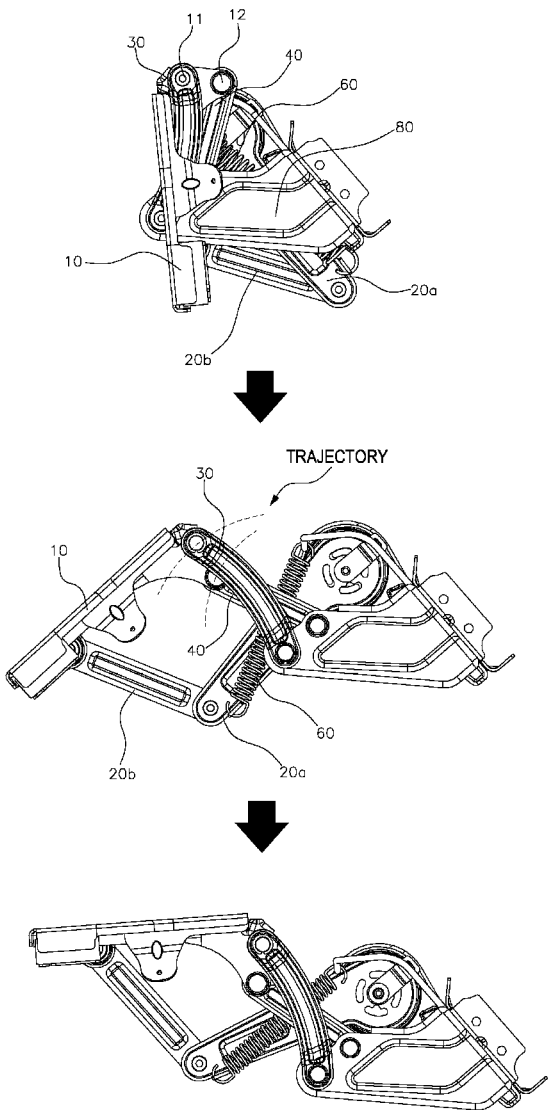
FIG. 3 is an exemplary embodiment of a view sequentially illustrating lateral appearances of the leg rest illustrated in FIG. 2 while the leg rest is drawn from a stored position to a deployed position according to an exemplary embodiment of the present invention.
Figure 4:
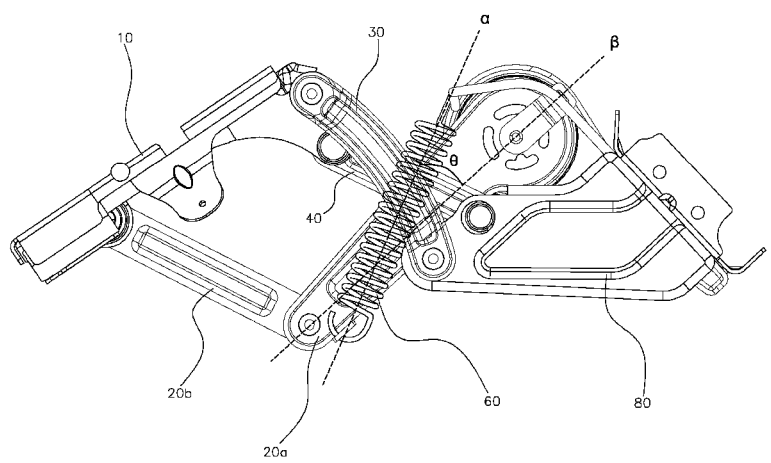
FIG. 4 is an exemplary view illustrating an included angle θ formed between a centerline α in a longitudinal direction of a spring and a centerline β in a longitudinal direction of a rear lift link according to an exemplary embodiment of the present invention.

Referring to FIGS. 2 to 4, a lift link 20 (20a and 20b) may be connected to a center of a rear surface of the leg rest panel 10 (i.e., a surface disposed adjacent or opposite to a front surface where the seated passenger's calves are placed) and front guide links 30 and rear guide links 40 that may be mounted on link bases 80 and may be mounted in pairs at both sides of the lift link 20, with the lift link 20 disposed therebetween. In other words, one link base 80, one front guide link 30, and one rear guide link 40 may be defined as one group. In particular, two groups may be disposed at both sides of the leg rest panel 10. For example, one for each side with the lift link 20 disposed between the two groups. A rear end of the lift link 20 may be rotatably coupled to the seat and a front end of the lift link 20 may be rotatably coupled to the leg rest panel 10. An articulation motion may be actuated between the front end and the rear end. The lift link 20 may include a rear lift link 20a with a rear end rotatably coupled to the seat and a front lift link 20b with a rear end rotatably coupled to a front end of the rear lift link 20a. Further, a front end may be rotatably coupled to the leg rest panel 10 at a front side of first coupling portions 11 and second coupling portions 12.

The front guide links 30 and the rear guide links 40 may be mounted at front ends of the link bases 80, respectively that may be spaced apart from the lift link 20 and may include rear ends fixed to the seat and the front ends disposed to be directed toward a front side of the seat. In other words, a front end of the front guide link 30 may be rotatably connected to the first coupling portion 11 of the leg rest panel 10 and a rear end of the front guide link 30 may be rotatably connected to the link base 80. The rear guide link 40 may be rotatably connected to the second coupling portion 12 of the leg rest panel 10 that may be spaced apart from the first coupling portion 11. A rear end of the rear guide link 40 may be rotatably coupled to the link base 80 at a point that is rearward spaced apart at a predetermined distance from the point that may connect the front guide link. In particular, the rear guide link 40 may have a length that is less than the front guide link 30.

The rear guide link 40 may have a length less than the front guide link 30 and to rotate the leg rest panel 10 at an angle when the seated passenger's calves may be supported when the leg rest panel 10 is drawn, by a difference in trajectory (see the portion indicated by "TRAJECTORY" in FIG. 3) between the front guide link 30 and the rear guide link 40 when the leg rest panel 10 is configured to be adjusted from the stored position to the deployed position. In the exemplary embodiment, a position where the rear lift link 20a is mounted is not particularly limited. For example, the rear lift link 20a may be rotatably coupled to a seat recliner 70 that may be included in the seat and may be configured to adjust an angle of a backrest of the seat. A bracket 71 may be coupled to the seat recliner 70 and the link base 80 may be coupled together to a panel 90 that forms the seat.

In the exemplary embodiment, the front guide link 30 may be formed in an arc shape to further increase rigidity in a direction that supports the seated passenger's calves. For example, the first coupling portion 11 may be disposed at a higher position than the second coupling portion 12 when the leg rest panel 10 at the deployed position. The front guide link 30 and the rear guide link 40 may be disposed to form an 'X' shape. Springs 60 may be coupled at both sides of the rear lift link 20a, respectively. In particular, a first end of the spring 60 may be fixed to the seat through a mount bar 61 and a second end of the spring 60 may be coupled to the rear lift link 40 (e.g., in the vicinity of a connecting point between the rear lift link and the front lift link). In the exemplary embodiment, as illustrated in FIG. 4 in more detail, a centerline α in a longitudinal direction of the spring and a centerline β in a longitudinal direction of the rear lift link may be disposed to form an included angle θ of 0° or greater. The included angle θ may be formed within a range from 10° to 45°.

Therefore, the spring 60 may be configured to provide an elastic force in a direction in which the position of the leg rest panel 10 is maintained when the leg rest panel 10 is at the stored position. Further the spring 60 may be configured to provide an elastic force in order to assist in the effort to draw the leg rest panel 10 after the spring 60 extends maximally (e.g., goes beyond the dead point) when the leg rest panel 10 is drawn. When the leg rest panel 10 is fully drawn, the elastic force of the spring 60 may be configured to support a load applied to the seated passenger's calves.

According to an exemplary embodiment the leg rest apparatus may be configured as described above. Since the first coupling portion 11 and the second coupling portion 12 may be spaced apart from each other at a predetermined distance and the front guide link 30 and the rear guide link 40 may include different lengths, as illustrated in FIG. 2. The front guide link 30 and the rear guide link 40 may be configured to rotate along different trajectories. Therefore, the lift link 20 may be configured to adjust the leg rest panel 10 forward. The front guide link 30 and the rear guide link 40 may be configured to rotate a rear portion of the leg rest panel 10 to deploy the leg rest panel 10 at an angle when the seated passenger's calves may be supported. Accordingly, the operating force of the leg rest may be tuned to meet the specifications by adjusting the positions of the first coupling portion 11 and the second coupling portion 12 and/or adjusting the lengths of the front guide link 30 and the rear guide link 40 (i.e., increasing or decreasing a difference in trajectory). As illustrated in FIGS. 5A and 5B, when the leg rest panel 10 is at the deployed position, the leg rest panel 10 may be further moved downward by approximately 40 mm than a structure in the related art.

According to the exemplary embodiment having the aforementioned configuration, since the centerline α in the longitudinal direction of the spring and the centerline β in the longitudinal direction of the rear lift link may be disposed to form the included angle θ of 0° or greater, the spring 60 may be configured to extend beyond the dead point (e.g., extends maximally) while the leg rest panel 10 is drawn from the stored position to the deployed position. The elastic force of the spring 60 may be configured to prevent swaying of the leg rest panel 10 and may be configured to maintain the position of the leg rest panel 10 when the leg rest panel 10 is disposed at the stored position. The elastic force of the spring 60 may be configured to more stably support a load applied to the seated passenger's calves when the leg rest panel 10 is at the deployed position.

Since the leg rest panel 10 may be configured to rotate by a difference in trajectory between the front guide link 30 and the rear guide link 40 at the same time when the leg rest panel 10 is moved forward by the lift link 20, the link motion may be simplified compared to the link motion in the related art structure. Accordingly, the number of components and a weight of the apparatus may be reduced. Since the deformation amount of the spring 60 for each movement distance of the leg rest panel 10 may be reduced and the operating force may be decreased. A portion of the seated passenger's legs may be in direct contact with the leg rest panel may be disposed further downward compared to the structure in the related art (see FIG. 5), which may improve the support quality of the apparatus.

The present invention, which has been described above, is not limited by the aforementioned exemplary embodiment and the accompanying drawings, and it is obvious to those skilled in the art to which the present invention pertains that various substitutions, modifications and alterations may be made without departing from the technical spirit of the present invention.

What is claimed is:

1. A leg rest apparatus, comprising:
   a leg rest panel configured to be adjusted between a deployed position at which the leg rest panel is drawn at a front lower end of a seat and a stored position when the leg rest panel is folded toward the seat;

a lift link with a rear end rotatably coupled to the seat, and a front end rotatably coupled to the leg rest panel, and configured to perform an articulation motion between the front end and the rear end;

a link base spaced apart from the lift link and having a rear end coupled to the seat, and a front end disposed to be directed toward a front side of the seat;

a front guide link having a front end rotatably connected to a first coupling portion of the leg rest panel, and a rear end rotatably connected to the link base; and a rear guide link with a length less than the front guide link, and having a front end rotatably connected to a second coupling portion of the leg rest panel separated from the first coupling portion, and a rear end rotatably connected to the link base, wherein when the leg rest panel is configured to move from the stored position to the deployed position, the leg rest panel is drawn while rotating by a difference in trajectory between the front guide link and the rear guide link.

2. The structure of claim 1, wherein when the leg rest panel is at the deployed position, the first coupling portion is disposed at a higher position than the second coupling portion, and the front guide link and the rear guide link form an 'X' shape.

3. The apparatus of claim 2, wherein one link base, one front guide link, one rear guide link, and one spring are defined as one group, and two groups are disposed at both sides of the leg rest panel, one for each side, with the lift link disposed between the two groups.

4. The apparatus of claim 2, wherein a second end of a spring, one end of which is fixed to the seat, is coupled to the rear lift link.

5. The apparatus of claim 4, wherein an imaginary centerline $\alpha$ in a longitudinal direction of the spring and an imaginary centerline $\beta$ in a longitudinal direction of the rear lift link are disposed to form an included angle $\theta$ of 0° or more, to provide the spring an elastic force in a direction in which the position of the leg rest panel is maintained when the leg rest panel is at the stored position, and the spring provides elastic force in a direction in which the elastic force assists in the effort to draw the leg rest panel after the spring is maximally extended as the leg rest panel is drawn.

6. The apparatus of claim 1, wherein the lift link is coupled to a rear lift link with a rear end rotatably coupled to the seat, and a front lift link with a rear end rotatably coupled to a front end of the rear lift link, and a front end rotatably coupled to the leg rest panel at a front side of the first coupling portion and the second coupling portion.

7. The apparatus of claim 6 wherein a second end of a spring, one end of which is fixed to the seat, is coupled to the rear lift link.

8. The apparatus of claim 7, wherein an imaginary centerline $\alpha$ in a longitudinal direction of the spring and an imaginary centerline $\beta$ in a longitudinal direction of the rear lift link are disposed to form an included angle $\theta$ of 0° or more, to provide the spring an elastic force in a direction in which the position of the leg rest panel is maintained when the leg rest panel is at the stored position, and the spring provides elastic force in a direction in which the elastic force assists in the effort to draw the leg rest panel after the spring is maximally extended as the leg rest panel is drawn.

9. The apparatus of claim 6, wherein the rear lift link is rotatably coupled to a seat recliner disposed in the seat.

10. The apparatus of claim 9, wherein a second end of a spring, one end of which is fixed to the seat, is coupled to the rear lift link.

11. The apparatus of claim 10, wherein an imaginary centerline $\alpha$ in a longitudinal direction of the spring and an imaginary centerline $\beta$ in a longitudinal direction of the rear lift link are disposed to form an included angle $\theta$ of 0° or more, to provide the spring an elastic force in a direction in which the position of the leg rest panel is maintained when the leg rest panel is at the stored position, and the spring provides elastic force in a direction in which the elastic force assists in the effort to draw the leg rest panel after the spring is maximally extended as the leg rest panel is drawn.

12. The apparatus of claim 6, wherein the front guide link is formed in an arc shape.

13. The apparatus of claim 12, wherein a second end of a spring, one end of which is fixed to the seat, is coupled to the rear lift link.

14. The apparatus of claim 13, wherein an imaginary centerline $\alpha$ in a longitudinal direction of the spring and an imaginary centerline $\beta$ in a longitudinal direction of the rear lift link are disposed to form an included angle $\theta$ of 0° or more, to provide the spring an elastic force in a direction in which the position of the leg rest panel is maintained when the leg rest panel is at the stored position, and the spring provides elastic force in a direction in which the elastic force assists in the effort to draw the leg rest panel after the spring is maximally extended as the leg rest panel is drawn.

* * * * *